United States Patent [19]
Dean

[11] Patent Number: 5,513,936
[45] Date of Patent: May 7, 1996

[54] CONTAINER TRANSFER AND USER INTERFACE FOR OVER/UNDER CONVEYORS

[75] Inventor: Carl W. Dean, Cincinnati, Ohio

[73] Assignee: The Champion Company, Springfield, Ohio

[21] Appl. No.: 229,231

[22] Filed: Apr. 18, 1994

[51] Int. Cl.[6] ............................................. B65G 1/08
[52] U.S. Cl. ..................... 414/273; 414/276; 414/278; 414/640
[58] Field of Search ....................... 414/276–278, 414/273, 281, 403, 422, 609, 610, 628, 629, 639–642; 198/435

[56] References Cited

U.S. PATENT DOCUMENTS

| | | | |
|---|---|---|---|
| 1,912,898 | 6/1933 | Jennings et al. | 198/463.2 |
| 2,790,567 | 4/1957 | Rockhill | 198/463.3 |
| 2,942,716 | 6/1960 | Stone | 414/422 X |
| 2,993,582 | 7/1961 | Souser | 198/463.3 |
| 3,750,804 | 8/1973 | Lemelson | 414/276 |
| 3,805,974 | 4/1974 | Andersson et al. | 414/276 |
| 3,921,828 | 11/1975 | Suizu | 414/281 X |
| 4,192,496 | 3/1980 | Baselice et al. | 198/463.3 |
| 4,284,187 | 8/1981 | Kramer et al. | 198/435 |
| 4,909,697 | 3/1990 | Bernard, II et al. | 414/276 X |
| 4,977,999 | 12/1990 | Smock | 198/463.3 |
| 5,141,380 | 8/1992 | Kato et al. | 414/273 |
| 5,161,929 | 11/1992 | Lichti, Sr. et al. | 414/273 X |
| 5,284,252 | 2/1994 | Bonnet | 414/278 |

FOREIGN PATENT DOCUMENTS

| | | | |
|---|---|---|---|
| 96505 | 12/1983 | European Pat. Off. | 414/276 |
| 2591205 | 6/1987 | France . | |
| 2805572 | 8/1979 | Germany . | |
| 12204 | 2/1981 | Japan | 414/276 |
| 12002 | 1/1984 | Japan | 414/278 |
| 128133 | 7/1984 | Japan | 414/276 |
| 59-149210 | 8/1984 | Japan . | |
| 127905 | 5/1988 | Japan | 414/276 |
| 48316 | 2/1990 | Japan | 414/276 |
| 1207949 | 10/1970 | United Kingdom . | |

*Primary Examiner*—David A. Bucci
*Attorney, Agent, or Firm*—Fay, Sharpe, Beall, Fagan, Minnich & McKee

[57] ABSTRACT

A transfer mechanism for moving container between over/under, entrance/exit gravity rollerway conveyors also holds the containers at a position for user interface in removing articles from or inserting articles into the container. The power operated scissors mechanism moves the carriage vertically between the conveyors, while a first piston-cylinder tilts the carriage at an angle to match an aligned conveyor with respect to a first axis and a second piston-cylinder tilts the carriage about a second orthogonally arranged axis to determine an appropriate user interface tilt. An automatic control, in response to a single input command from the user, cycles the carriage for unloading a container, loading a new container, and placing the new container at a predetermined user position. Additional user commands can override the predetermined user position to adjust the tilt and height of the carriage for the user, which adjustment may be temporary or stored as a new predetermined user position.

26 Claims, 9 Drawing Sheets

5,513,936

CONTAINER TRANSFER AND USER INTERFACE FOR OVER/UNDER CONVEYORS

BACKGROUND OF THE INVENTION

The present invention relates to a material handling system, particularly a conveyor system for handling containers, such as individual boxes for the loading or removal of articles from the boxes.

In prior systems, boxes are placed at a somewhat convenient location for an average person who then removes articles from the boxes or places articles in the boxes. A mechanized system will move the boxes from a supply conveyor and when the person is through with the boxes, the person may place the boxes upon a return conveyor or the mechanism may place the boxes upon the return conveyor.

Since a person is involved in placing articles in or removing articles from the container, there is a troublesome interface between the person in such activity and a conveyor system, as well as between the person and the conveyor system relating to controlling the conveyor system.

SUMMARY OF THE INVENTION

It is an object of the present invention to improve the interface between a user and a conveyor system, to improve efficiency and user ergonomics.

More specifically, it is an object of the present invention to automate as much of the box/container handling and positioning as possible; to automatically stop the box at a readjusted position for the particular user for loading or unloading articles; to provide a position override for temporarily or permanently changing the predetermined position as needs change, for example when the box becomes half loaded or half unloaded at which time it may be desirable to raise the box and/or tilt the box further towards the user, to decrease the manual handling of the box or manual control of box positioning or movement by the user, to decrease the throughput time for one box, and to improve the working environment for the user.

The boxes may first be provided to an inlet station by a gravity, generally horizontal conveyor tilted downward towards the inlet station and employing free rollers or ball bearings, or by a driven conveyor of any type, such as employing driven rolls or driven belt, or any combination of the same. Further, either preferably vertically above or vertically below the above mentioned entrance station conveyor, an exit station conveyor is provided and may be of the same structure basically as the entrance station conveyor, or of a different structure as mentioned above, for example. Most preferably, the entrance station conveyor and the exit station conveyor have gravity roller conveyor ways respectively sloping towards the entrance station and away from the exit station, which entrance station and exit station are vertically aligned.

A carriage is movable between the entrance station and exit station and tilted, with gravity rollers to be aligned with the same tilt as the stations. The carriage further positions a box at a selected user position, which may be further adjusted by an override from the user, for vertical and/or horizontal adjustment, as well as tilting about one or more horizontal axis.

The control interface is further improved in that a single command from the user is automatically responded to by the system for moving the carriage from the user position to the exit position, unloading the current box in the exit station, moving the carriage to the entrance station, loading a box from the entrance station onto the carriage, moving the carriage to the predetermined user position, and tilting the carriage to a predetermined user three-dimensional orientation. Further command or commands from the user may change temporarily or in a predetermined manner the user position, e.g. the height or tilt at the user position.

BRIEF DESCRIPTION OF THE DRAWINGS

Further objects, features and advantages of the present invention will become more clear from the following detailed description of a preferred embodiment, shown in the accompanying drawing, wherein.

DETAILED DESCRIPTION OF A PREFERRED EMBODIMENT

Figure 1:
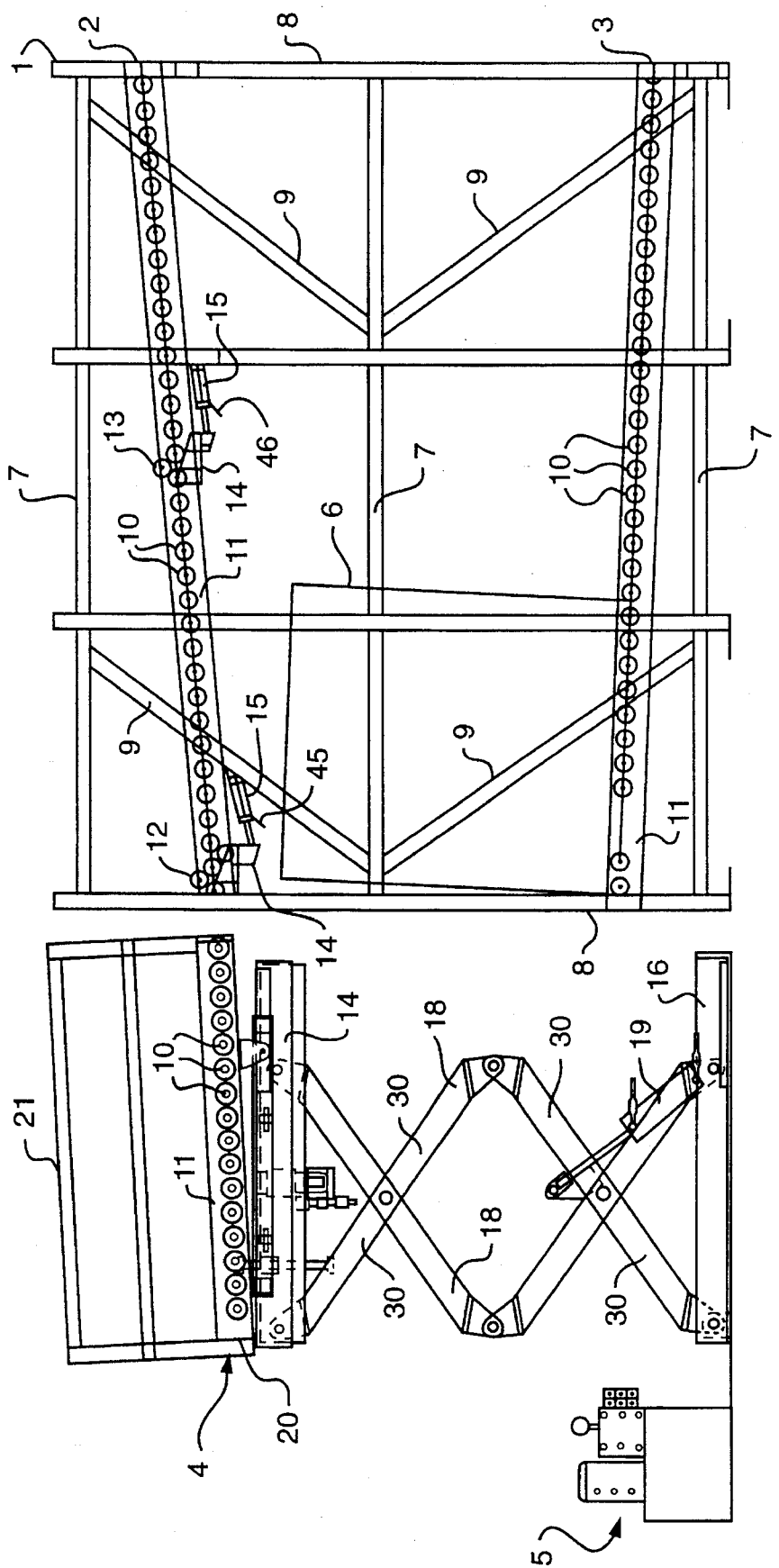
FIG. 1 is a right-side elevational view of the entire conveyor system of the present invention, which may be connected to further conveyor systems, showing the carriage aligned with the entrance station.

The preferred embodiment shown in the figures will be described, with respect to the drawing, wherein like numerals will apply to like parts throughout the views.

The preferred embodiment is directed towards a gravity rollerway conveyor, and certain features have advantageous with respect thereto, while broader aspects of the present invention and some of the features are equally applicable to other types of conveyors, such as belt conveyors or driven roller conveyors.

FIG. 1 shows a right-side elevational view of the entire conveyor system, according to the present invention. A rigid frame 1 carries an upper entrance conveyor 2 and a lower exit conveyor 3, an over/under conveyor system. A transfer mechanism 4 moves between the entrance conveyor 2 and the exit conveyor 3. The transfer mechanism 4 and the entrance conveyor 2 are controlled from a user input and control device 5. A container or box 6 is shown on the exit conveyor 3. It is understood that a plurality of identical containers 6 may be carried by the exit conveyor 3, a plurality of identical such containers 6 may carried by the entrance conveyor 2, and at least one container 6 may be carried on the transfer mechanism 4.

The frame 1 comprises a plurality of horizontally extending beams 7, posts 8 and braces 9 all rigidly interconnected. The exit conveyor 3 may be of any known conventional type, and is shown in the preferred form as a gravity roller conveyor having a plurality of freely rotatable rollers 11 mounted on parallel horizontal axes in a common plane extending perpendicular to the plane of FIG. 1 and sloping downwardly toward the right or away from the transfer mechanism 4. The rollers 10 are mounted in bearings between parallel roller beams 11, in a known manner. The entrance conveyor 2 has the same structure previously described with respect to the exit conveyor 3, but with its roller plane inclined downwardly toward the transfer mechanism 4, and additionally including a first stop dog 12 and a second stop dog 13 that each are moved from their illustrated position wherein they will stop and hold a container 6 on the entrance conveyor 2 by projecting above the rollers 10 and movable to a position downwardly therefrom (not shown) by a lever mechanism 14 and a piston-cylinder arrangement 15 to release a held container 6 for movement towards the left along the roller conveyor under the bias of gravity. Such dog mechanisms are not disclosed in detail, because they are of conventional structure. The dog mechanisms are selectively operated by the control portion of the user input and control device 5.

Figure 2:
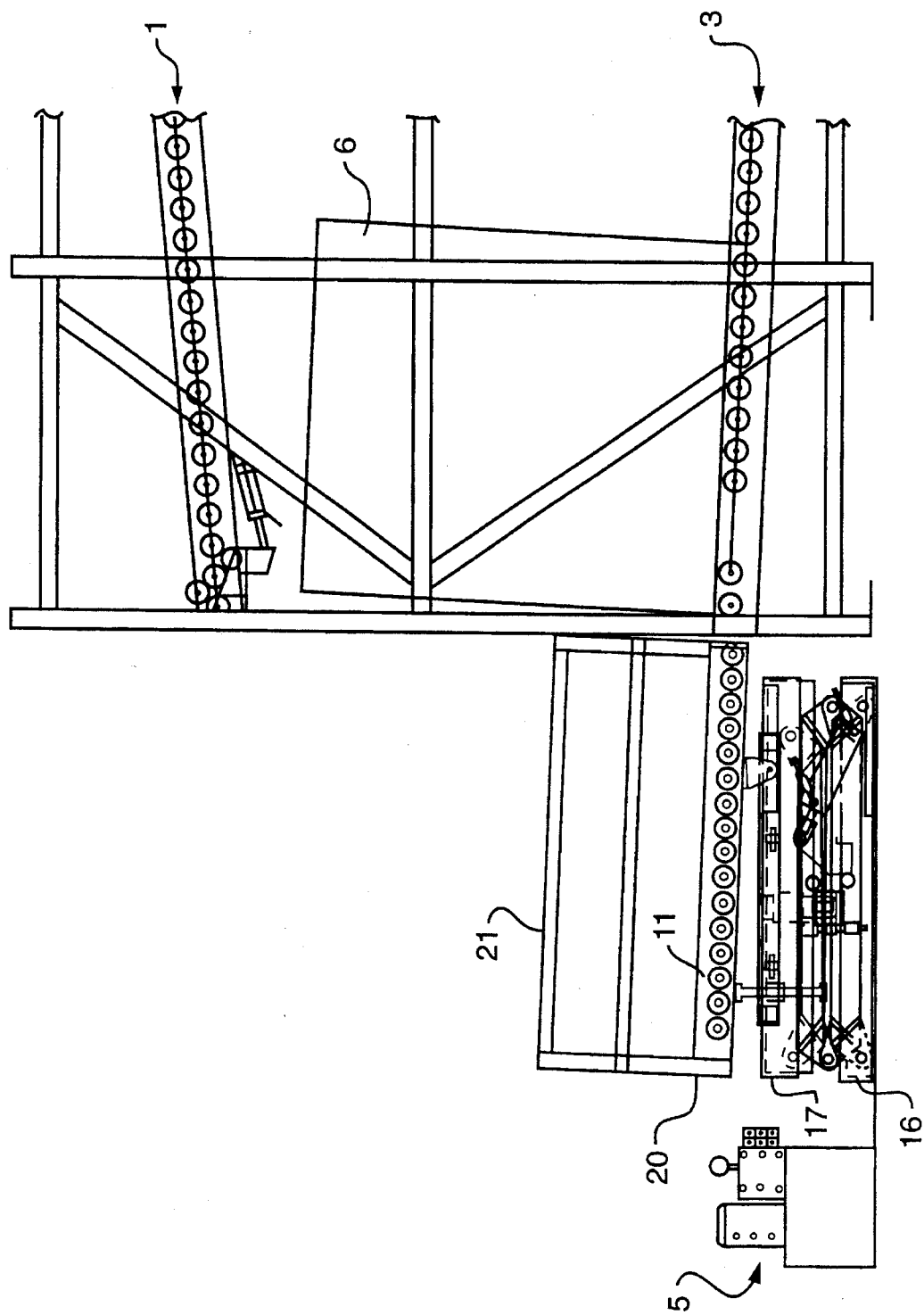
FIG. 2 is a right-side elevational view of a portion of the embodiment of FIG. 1, but showing the carriage aligned with the exit station.

The transfer mechanism 4 includes a fixed frame 16 that may be a generally rectangular horizontally extending steel pallet rigidly bolted to a floor to which floor also is bolted the rigid frame 1, a moveable frame 17 that is similar in structure to but not directly mounting to the fixed frame 16, a scissors mechanism 18 interconnecting the fixed frame 16 and movable frame 17 so that they may move vertically relative to each other at least within the range of movement whose extremes are shown in FIGS. 1 and 2, while maintaining the moveable frame 17 parallel to the fixed or rigid frame 16. A power member, particularly a piston-cylinder actuator 19 is connected between the scissors mechanism 18 and fixed frame 16 for moving the movable frame 17 to and between the various positions shown in the drawing under control of the user input and control device 5. A carriage 20 is movably mounted on the movable frame 17 for relative pivoting movement about two horizontal orthogonally (i.e., 90°) related axes between the various positions shown in the drawing. The carriage 20 includes a roller beam 11 and a plurality of rollers 10 for supporting a box and moving the box relative to the entrance conveyor 2 in FIG. 1 and the exit conveyor 3 in FIG. 2. Additionally, three out of four sides of the carriage 20 are provided with fences 21 to prevent a container 6 supported on the carriage 20, more specifically on the rollers 10 of the carriage 20, from moving to the left off of the carriage 20 in FIG. 1 or moving to the right or left off of the carriage 20 in FIG. 3, while permitting exchange of a container 6 between the carriage 20 and either the entrance conveyor 2 in FIG. 1 or the exit conveyor 3 in FIG. 2. The mechanism for tilting the carriage 20 relative to the fixed frame 17 is illustrated more clearly in FIGS. 3 and 4.

Figure 4:
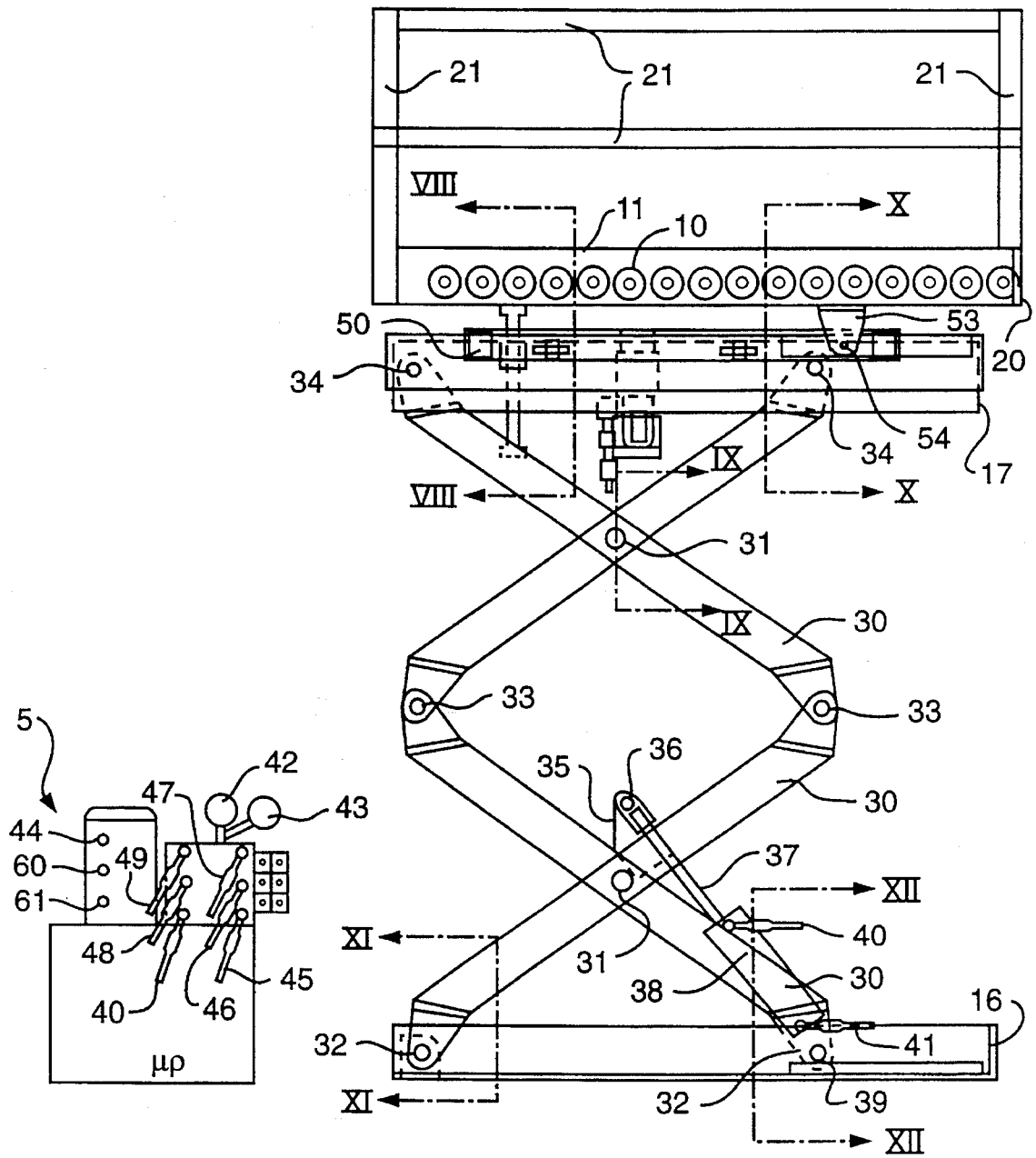
FIG. 4 is a right-side elevational view corresponding to FIG. 1, but with the carriage in the neutral horizontal position of FIG. 3, on an enlarged scale corresponding to the enlarged scale of FIG. 3 (a scale larger than that of FIGS. 1 and 2), and without showing the entrance and exit conveyors.
Figure 5:
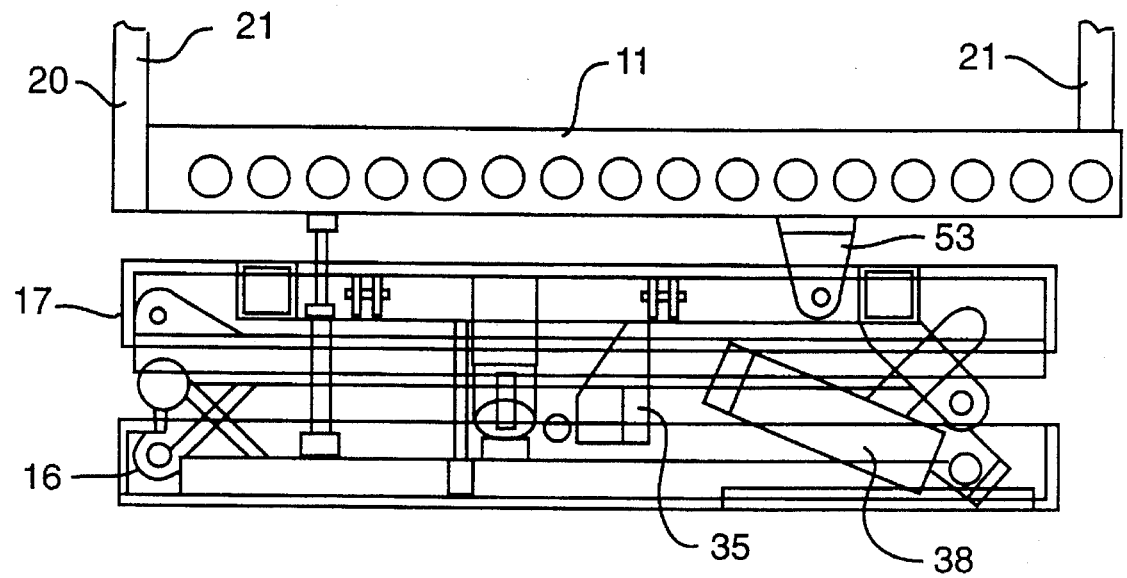
FIG. 5 is a right-side elevational view of an enlarged portion of FIG. 2 showing the carriage at the user position, but with a neutral or horizontal inclination.

The user input and control device 5 is more clearly shown in FIG. 4.

Figure 9:
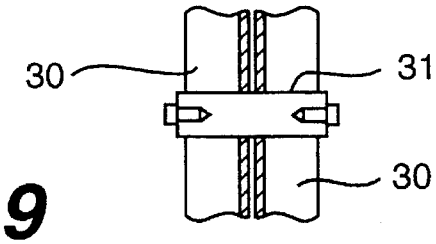
FIG. 9 is a partial cross-sectional view taken along line IX—IX of FIG. 4.

The power device for moving the carriage vertically will be discussed in detail. The scissors mechanism 18 includes (to the right and left of FIG. 3) a pair of lower arms 30 to the right of FIG. 3, a pair of lower arms 30 to the left of FIG. 3, a pair of upper arms 30 to the right of FIG. 3, and a pair of upper arms 30 to the left of FIG. 3 (eight arms 30, total). Each pair of arms 30 are pivotally connected at their mid portions as shown in FIG. 9, by a cross shaft 31. The terminal ends of the lower arms 30 are pivotally connected about axles 32 to the fixed frame 16. The upper terminal ends of the four lower arms 30 are pivotally connected to the lower terminal ends of the four upper arms 30 in pairs by axles 33. The upper terminal ends of the upper arms 30 are respectively pivotally connected to the rigid movable frame 17 by means of axles 34, respectively. A rigid cross member or cross brace 35 horizontally extends between and is welded at its opposite ends to one of the right-hand lower arms 30 and one of the left-hand lower arms 30, which lower arms are parallel to each other. The piston-cylinder actuator 19 has a piston rod 37 pivotally connected by an axle 36 to the mid portion of the cross brace 35 and a cylinder 38 pivotally connected by an axle 39 to the rigid frame 16. A fluid line 40 to retract the piston-cylinder actuator 19 and therefore compress the scissors mechanism 18 and lower the carriage 20 is connected back to the user input and control device 5. Likewise, a fluid line 41 to a fluid pump, not shown, is included to extend the piston-cylinder activator 19 and extend the scissors mechanism 18. Herein the hydraulic (fluid) connections between the actuating mechanisms of the conveyor system and the user input and control device 5 will only be shown with respect to their terminal ends and the intervening conduits will not be shown because such structure would obscure the drawing. Of course pneumatic actuators could be used or electrical actuators could be used. Hydraulic fluid will expand the piston, to expand the scissors mechanism 18 and to move the carriage 20 upward. A first manual override lever or control 42 is provided on the user input and control device 5 for the user to actuate the piston-cylinder actuator 19 to temporarily move the carriage to any position above or below a normal fixed user position of FIG. 7. In a manner to be described hereinafter, a second manual override lever or control 43 is used to tilt the carriage toward and away from the user (not shown, but who would be to the right in FIG. 7) in the user position of FIG. 7 of the carriage. The controls 42 and 43 are temporary controls used to override the automatic user position or fixed predetermined user position to be described with respect to FIG. 13. If desired, a control button or switch 44 may be pushed by the user to permanently store the new user position, as adjusted by the controls 42, 43, which then becomes the fixed predetermined user position referred to with respect to the sequential automatic control hereinafter described with respect to FIG. 13. Actuation of the cylinder 38 by selectively pressurizing and venting lines 40 and 41 is further controlled by an automatic sequencing program within a microprocessor μp of the user input and control device 5 which control will be described later with respect to FIG. 13, particularly with respect to steps 103, 107 and 111.

With reference to FIG. 1 and the entrance conveyor 2, the stop dog 12 is normally biased by a spring or the like into its upward illustrated position wherein a box 6 (not shown)

resting on the rollers 10 of the entrance conveyor 2 will be stopped and held at its forward edge by the dog 12. The automatic sequencing to be described hereinafter releases the forward most box at the entrance end or station (left) of the entrance conveyor 2 for movement of the box by gravity onto the rollers 10 of carriage 20, when the automatic sequencing control to be described later with respect to FIG. 13 operates according to step 109, fluid from pressurizing line 45 of the user input and control device shown in FIG. 4 will be pressurized to activate piston-cylinder arrangement 15 to retract the dog 12, and permit the container 6 to move from the entrance conveyor onto the carriage 20. When this transfer of the container 6 from the entrance conveyor 2 onto the carriage 20 has been completed, as determined for example by a timer or limit switches or photoelectric eyes (not shown), the control program within the user input and control device 5 will automatically release the pressure in line 45 to again extend the dog 12 and at the same time pressurize the cylinder 15 to retract the dog 13 by pressurizing line 46, which permits the next container 6 (not shown) on the entrance conveyor 2 to move to a position where it is then stopped by the dog 12. A suitable timer of the program, photoelectric eye or limit switch thereby makes sure that only one such container moves forward to the dog 12, after which the pressure within line 46 is released and the dog 13 extended to stop a following container (not shown). Such would complete the details of step 109 of FIG. 13.

Figure 3:
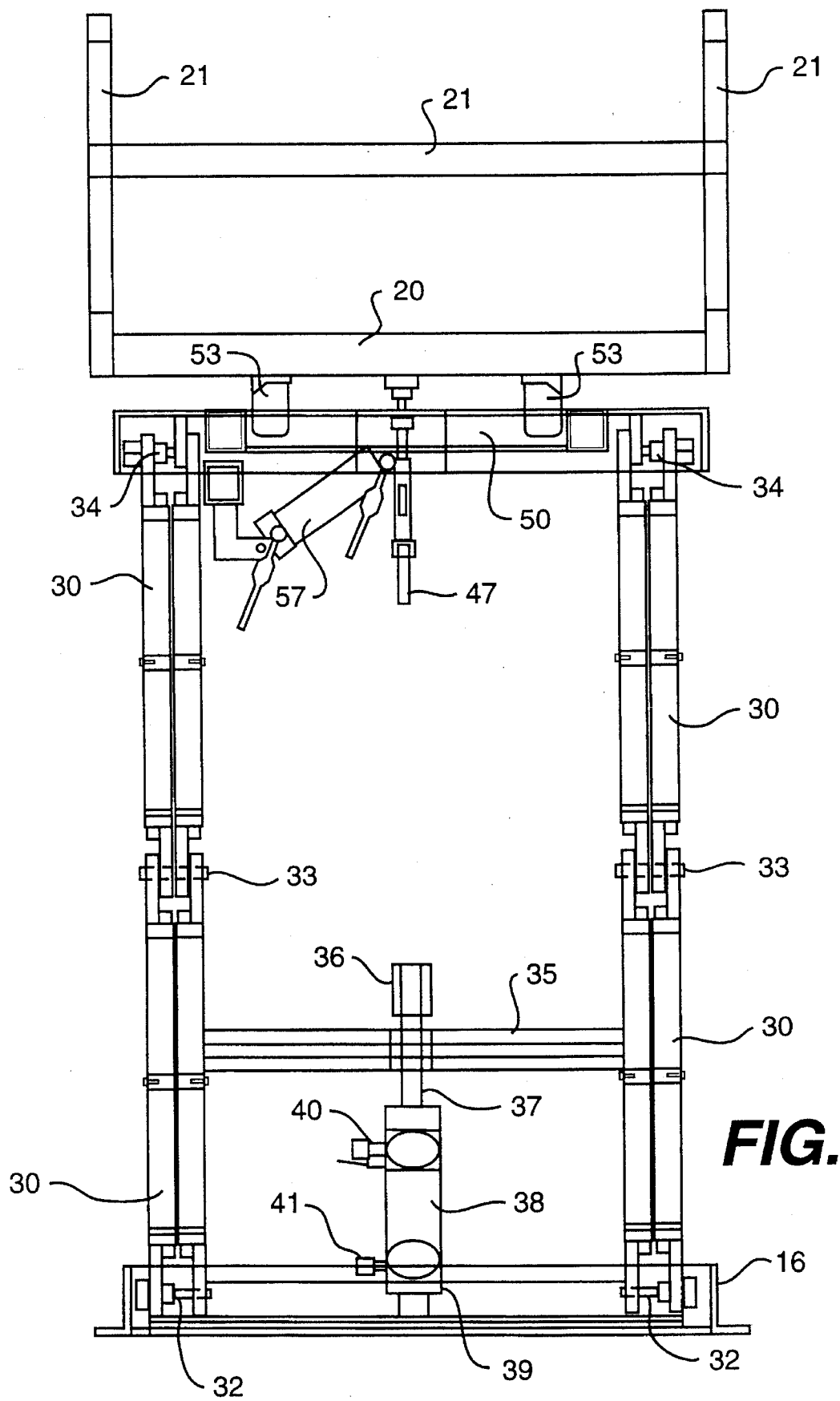
FIG. 3 is a front elevational view of a portion of a conveyor system with a user control station, entrance conveyor and exit conveyor removed to improve clarity in showing the carriage and carriage supporting structure, with the carriage in a neutral horizontal position.
Figure 6:
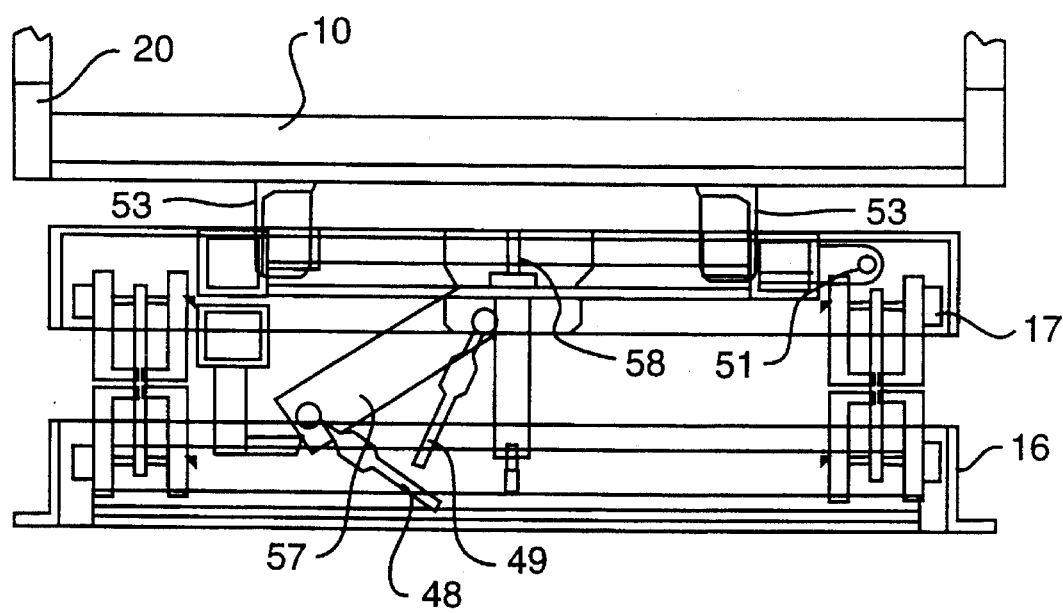
FIG. 6 is a front elevational view on the enlarged scale of and corresponding to FIG. 3, but with the carriage in the user position with a neutral tilt, that is corresponding to FIG. 5.
Figure 10:
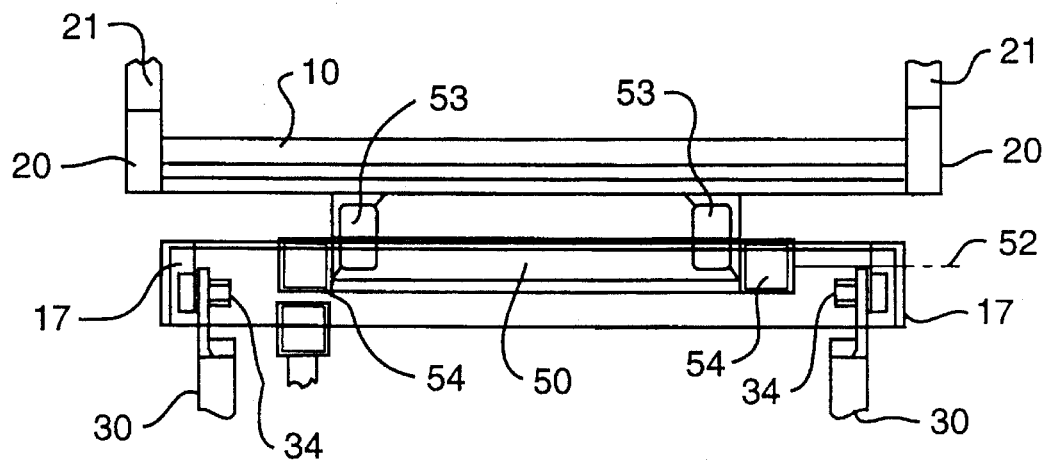
FIG. 10 is a partial cross-sectional view taken along line X—X of FIG. 4.
Figure 11:
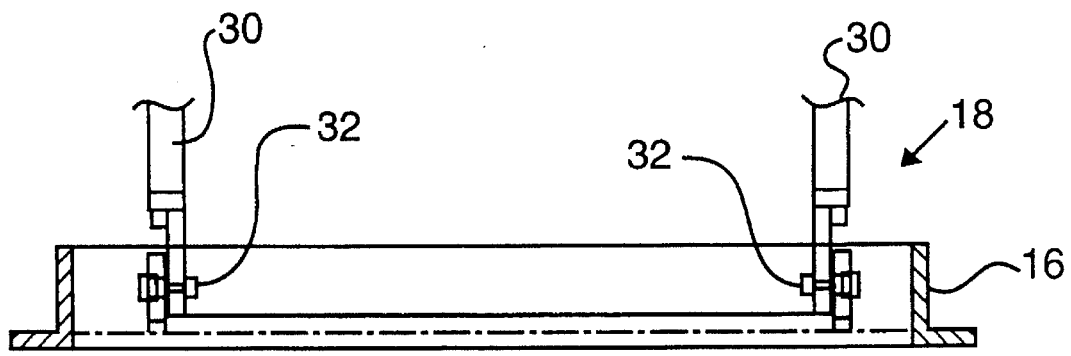
FIG. 11 is a partial cross-sectional view taken along line XI—XI of FIG. 4.
Figure 12:
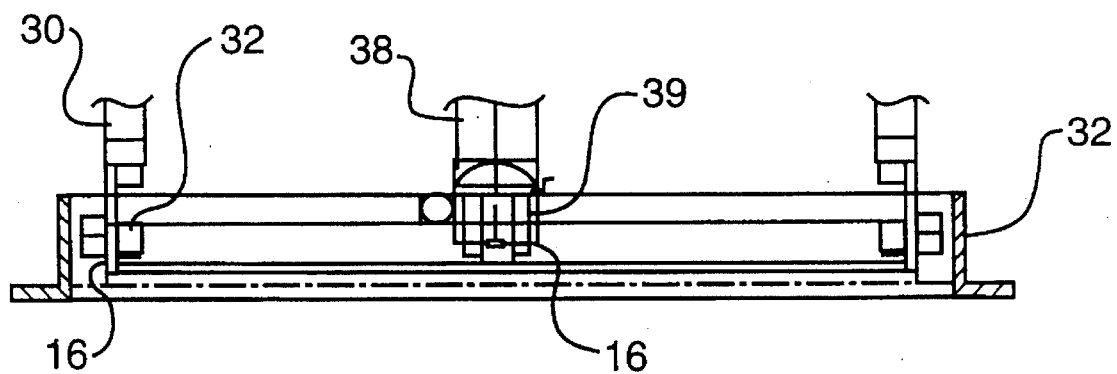
FIG. 12 is a partial cross-sectional view taken along line XII—XII in FIG. 4.

The mechanism for tilting the carriage relative to the fixed frame 17 will now be described with reference to FIGS. 3, 4, 5, 8 and 10. The movable frame 17 is constructed of four steel angle plates welded in a rectangular frame, and various depending welded flanges for supporting the axles 34. A first rigid subframe 50 is small enough to fit inside of the rigid frame 17 as shown in FIGS. 3, 4 and 10. An axle 51 having a horizontal axis perpendicular to the plane of FIGS. 3, 8 and 10 pivotally connects the frame 17 and the first subframe 50. Such axle 51 permits the carriage 20 to pivot about a horizontal axis perpendicular to FIG. 6 and FIG. 7, between the positions of FIGS. 6 and 7, to adjust the tilt for the user. The carriage 20 is in the position of FIG. 6, with respect to the axle 51, at the exit position of FIG. 2, at the entrance position of FIG. 1 and perhaps at other positions, as a part of the neutral position of steps 102, 106 and 110, and during steps 103, 104, 105, 106, 107, 108, 109, 110 and 111. The carriage is tilted to the position of FIG. 7, with respect to axle 51 during step 112 and at the beginning of step 102.

Figure 7:
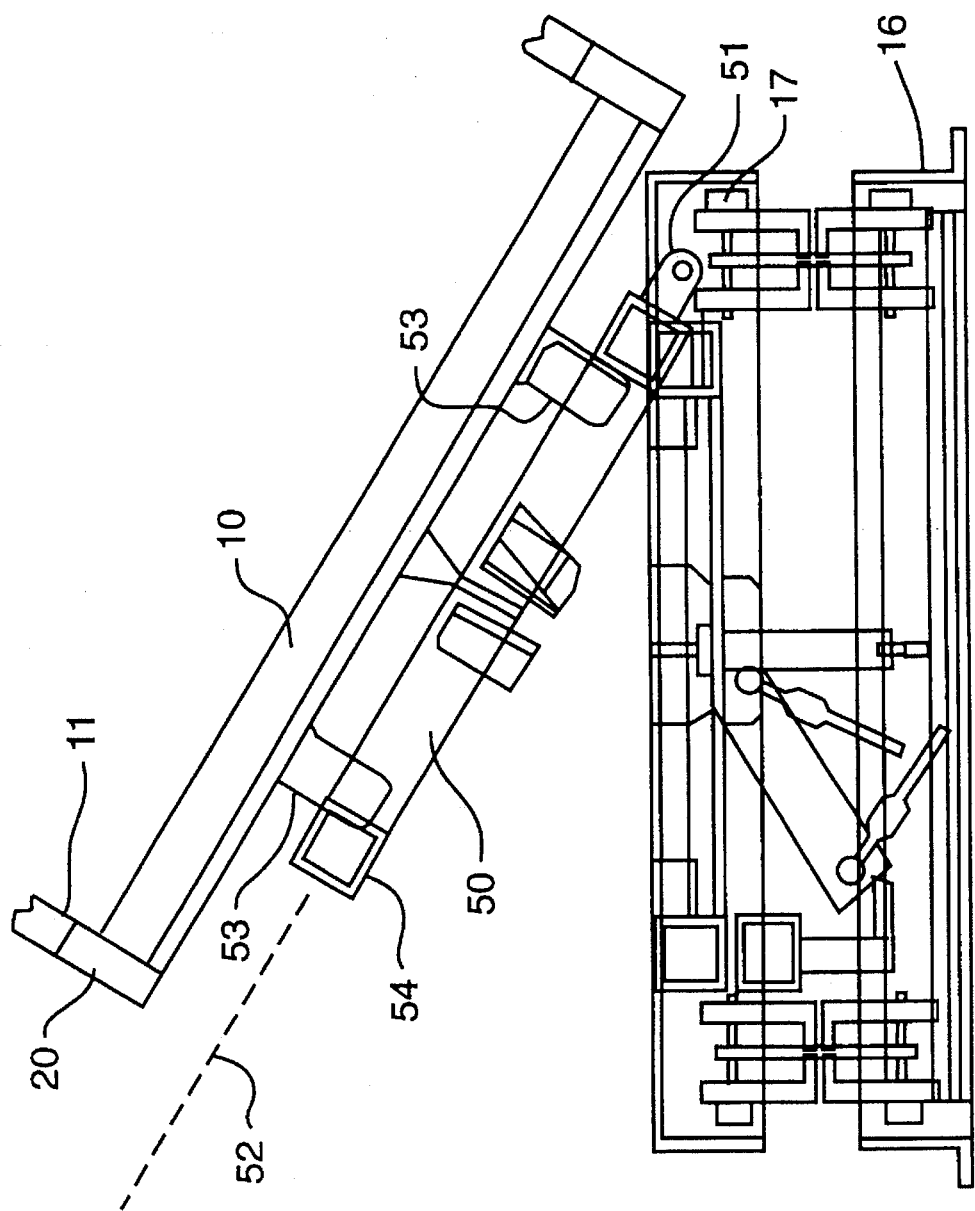
FIG. 7 is a front elevational view corresponding to FIG. 6, but with the carriage having a positive tilt.
Figure 8:
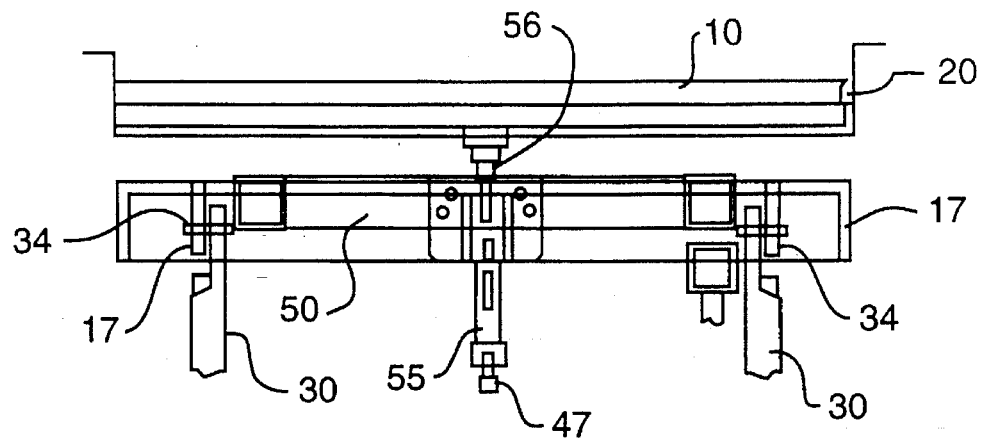
FIG. 8 is a partial cross-sectional view taken along line VIII—VIII of FIG. 4.

The above mentioned first subframe 50 carries the carriage 20 for relative pivotal movement about an axis 52 shown in FIGS. 7 and 10 to perpendicularly intersect the axis of the axle 51. The carriage 20 has a plurality of depending flanges 53 rigidly secured to it and receiving respective axles 54 that are aligned with the axis 52 and that pivotally connect carriage 20 to the first subframe 50. Thus, the carriage 20 may tilt about axis 52 from a first entrance angle shown in FIG. 1, a second exit angle shown in FIG. 2 in the neutral position of FIG. 6 wherein the carriage is not tilted with respect to axle 51; this tilting is automatically under the control of the control program, when the user presses button 60. The exit angle of FIG. 2 is provided with respect to the axis 52 during step 105, whereas the entrance angle of FIG. 1 with respect to axis 52 is provided for or during step 109. The carriage 20 is tilted about the axis 52 by means of a piston 55 pivotally connected to the first subframe 50 and a piston rod 56 pivotally connected to the carriage 20. The piston 55, piston rod 54 are actuated by hydraulic line 47. The carriage 20 and first subframe 50 are pivoted about the axis of axle 51 by means of a piston 57 pivotally connected to the rigid frame 17 and a piston rod 58 pivotally connected to the subframe 50, which piston and piston rod 57, 58 are controlled by hydraulic lines 48, 49, by the user manipulating levers 43 in override or by the control program in automatic operation when button 60 is pressed.

Figure 13:
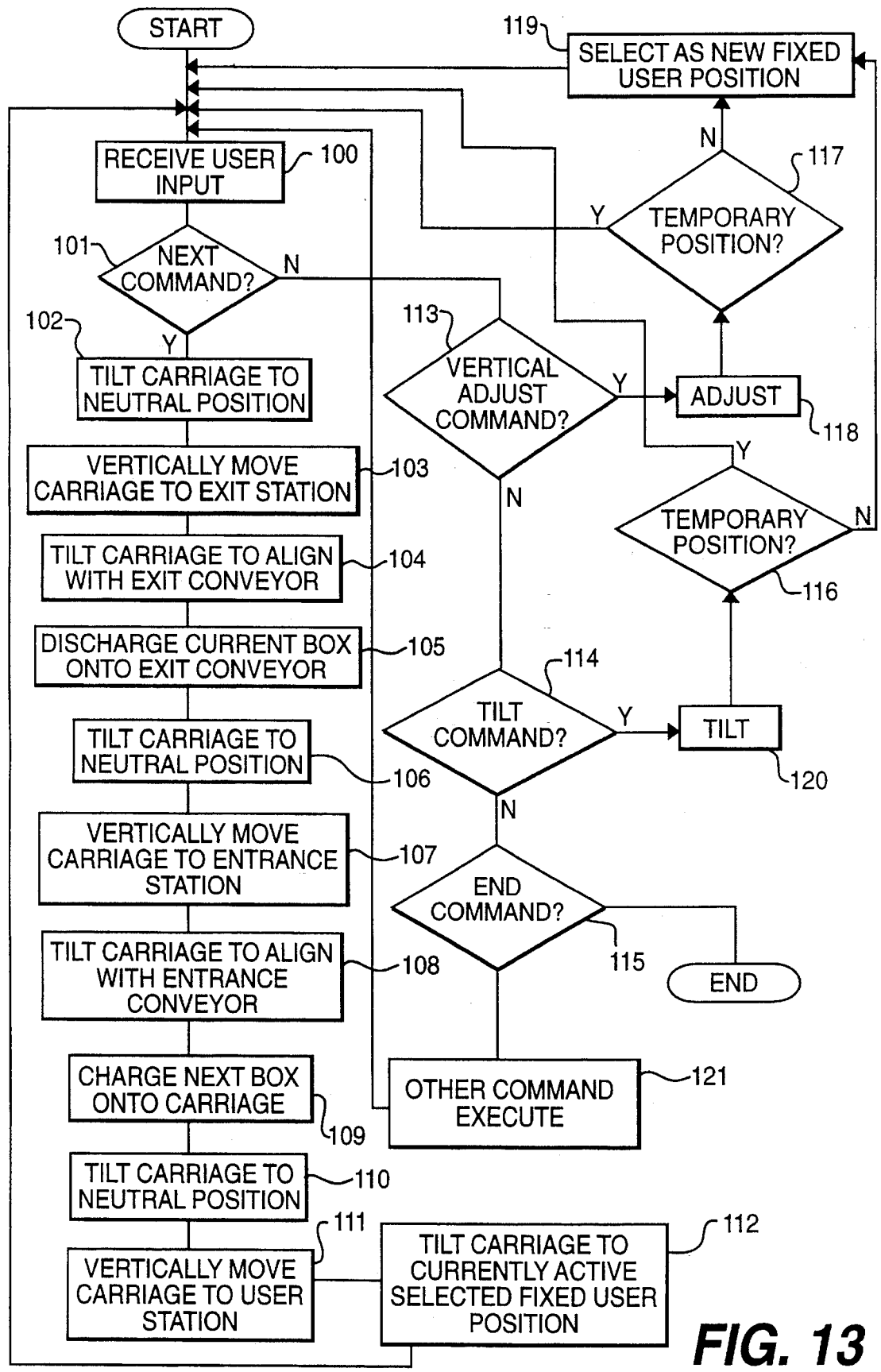
FIG. 13 is a flow chart of the operation of the automatic and manual override control of the conveyor system.

While the operation of the present invention has been described along with the structure, it also will be described with respect to FIG. 13.

Under control of the user input and control device 5, the user provides power to the system by actuating the button or switch 61 for start of the control as shown in the flow chart 13 and actuates again the same button to remove power from the system at the end portion of the flow chart. The user input and control device 5 includes a microcomputer for the automatic sequencing of steps 102–112, to perform the judgment of steps 101, 113–117, and control of the remaining steps. The user input and control device 5 further includes a source of pressurized hydraulic fluid and standardized valving for controlling the flow of such fluid with respect to the lines 45, 46, 47, 48, 49.

The user will input a command (for example with switches 44, 60, 61 or tilt controls 42, 43), which will be received by the system in step 100. Step 101 determines if the "next" command (the pressing of button 60) has been input. If it has, processing proceeds to steps 102–112 that are performed automatically, that is without any further user input. In step 102, the carriage 20 is tilted about its axle 51 with respect to the frame 17 until it reaches the neutral position of FIG. 6 instead of tilted as in FIG. 7; step 102 may be omitted if desired. In step 103, cylinder 38 is actuated to move the scissors mechanism 18 and change the height of the carriage 20 until it corresponds to the height of the exit conveyor 3. During step 104, the carriage is tilted about axis 52 to assume the inclination shown in FIG. 2. As the carriage is tilted in step 104, the gravity bias will cause the container held on the carriage 20 to move toward the right in FIG. 2 and to move onto the exit conveyor 3 to discharge the current box onto the exit conveyor according to step 105. Thereafter, step 106, which is identical to step 102, is performed; this step may be omitted. According to step 107, the cylinder 38 is actuated to vertically move the carriage from the general position of FIG. 2 to the general position of FIG. 1 adjacent the entrance station. During step 108, the carriage is tilted about the axis 52 to assume the inclination shown in FIG. 1 for alignment with the entrance conveyor 2. As previously explained with respect to step 109, the dog 12 of FIG. 1 is retracted to permit a container 6 to move from the entrance conveyor 2 onto the carriage 20 in FIG. 1. Step 110 is identical to step 102, and also may be omitted. Step 111 actuates the cylinder 38 to vertically move the carriage to the user station shown in FIG. 6. According to step 112, the carriage is tilted about the axis of axle 51 from its position of FIG. 6 to its position of FIG. 7, thereby defining the selected fixed user position of FIG. 7. That is the selected fixed user position is predetermined and stored, and it consists of the vertical height as determined by step 111 and shown in FIGS. 6 and 7 together with the tilt as determined by step 112 and shown in FIG. 7, so that the complete selected fixed user position is shown in FIG. 7. This fixed user position is selected by actuating button 60 according to step 119, to be described.

If step 101 determines that the received user input command is not the "next" command, step 113 determines if the command is a "vertical adjust" command, which may simply be determined by actuation of the lever 42 per se. If the "vertical adjust" command is present, the cylinder 38 is actuated as long as the command is present to move the carriage either up or down, depending upon the value of the command. For example, the lever 42 may be moved to the right to move the carriage up, returned to its vertical position to stop the downward movement of the carriage, moved to the left to move the carriage down and returned to its vertical position to stop the downward movement of the carriage. Thereby, the movement of the carriage may be to any possible position with infinite adjustment between those extreme positions of FIGS. 1 and 2, for example, to determine the position of FIG. 6 or may be even lower than the position of FIG. 2. It is desirable for the user to be able to adjust the vertical position of the carriage at the user position on a temporary basis. For example, if articles are being removed from a full box, and the box is now empty it may be desired to raise the box. Similarly, if articles are being placed in the box and the box is now half full, it may be desired to lower the box. Of course, the box height may be adjusted at the user position in correspondence with the height of the user. After such adjustment has been completed in accordance with step 118, step 117 determines if this is a temporary position and if it is control is returned to step 100 to await the next user input, and if it is not a temporary position, step 119 will store this new position as the new fixed user position to be used in step 112 with respect to the automatic portion of the operation. The button 44 may be actuated to distinguish between a temporary position and selecting/storing a new fixed user position.

If the answer to the inquiry of step 113 is no, it is determined if the command is a "tilt" command in accordance with step 114 and if it is the tilting is performed in accordance with step 120 followed by step 119. The "tilt" command is entered by lever 43 and tilting is about axle 51. Step 120 will actuate the appropriate piston cylinder to move the carriage about the axis of axle 51 to a temporary tilt position, at the user position of FIG. 7. For example, the user may grasp the lever 43 and move it to the right to tilt the box further towards the user, move the handle to the neutral vertical position to stop movement of the box, move the handle to the left of FIG. 4 for tilting the box away from the user and return the handle to the vertical upright position to stop the tilting of the box about the axis of the axle 51. The tilting of the box according to step 120 may be temporarily used by the user to facilitate loading and/or unloading of the box on the carriage at the user position, and step 119 may store such new tilted position in response to button 44 as a part of the selected fixed user position to later be used in step 112.

If the command is neither a "next" command, or a "vertical adjust" command or a "tilt" command or an "end" command obtained by button 61 then a still other command then will be executed in accordance with step 121, which forms no necessary part of the present invention, after which control is again returned to step 100 to await further input.

While a preferred embodiment has been set forth with specific details, further embodiments, modifications and variations are contemplated according to the broader aspects of the present invention, all as determined by the spirit and scope of the following claims.

I claim:

1. A transfer mechanism adapted to handle and transport containers, the transfer mechanism comprising in combination:
    a first upper gravity roller conveyor inclined at a first angle relative to horizontal, and having an input end and an output end for the containers;
    a second lower gravity roller conveyor inclined at a second angle relative to horizontal, and having an input end and an output end for the containers;
    an elevating mechanism having a first end and a second end, said first end of said elevating mechanism adapted for vertical movement between one of said ends of said first upper gravity roller conveyor and one of said ends of said second lower gravity roller conveyor;
    a carriage having a top for carrying one of the containers, being coupled to said first end of said elevating mechanism, a major horizontal axis, and a minor horizontal axis right angle related to said major horizontal axis;
    first angular adjustment means positioned between said first end of said elevating mechanism and said carriage, said first angular adjustment means for varying inclination of said carriage about said minor horizontal axis; and
    second angular adjustment means positioned between said first end of said elevating mechanism and said carriage, said second angular adjustment means for varying inclination of said carriage about said major horizontal axis.

2. The transfer mechanism according to claim 1, wherein said carriage is rectangular with a length and a width, said major axis is parallel to the length of said carriage and said minor axis is parallel to the width of said carriage.

3. The transfer mechanism according to claim 1, wherein said elevating mechanism is a scissors type mechanism.

4. The transfer mechanism according to claim 1, wherein said carriage has a length and a width, and said carriage includes a plurality of freely rotatable rollers positioned across said width of said carriage.

5. The transfer mechanism according to claim 4, wherein said elevating mechanism is a scissors type mechanism.

6. The transfer mechanism according to claim 1, wherein said first and second angular adjustment means includes a piston cylinder arrangement.

7. A transfer mechanism adapted to handle and transport containers, the transfer mechanism comprising in combination:
    a first conveyor inclined at a first angle relative to horizontal and having an input end and an output end for the containers;
    a second conveyor inclined at a second angle relative to horizontal and having an input end and an output end for the containers;
    an elevating mechanism having a first end and a second end, said first end of said elevating mechanism adapted for vertical movement between one of said ends of said first conveyor and one of said ends of said second conveyor;
    a carriage having a top for carrying one of the containers, being coupled to said first end of said elevating mechanism, a major horizontal axis, and a minor horizontal axis angularly related to said major axis;
    first angular adjustment means positioned between said first end of said elevating mechanism and said carriage, said first angular adjustment means for varying inclination of said carriage about said minor horizontal axis;
    a second angular adjustment means positioned between said first end of said elevating mechanism and said carriage, said second angular adjustment means for varying inclination of said carriage about said major horizontal axis;
    user input and control means for supplying control signals to said elevating mechanism and to said second angular adjustment means for automatically controlling movement between three sequential orientations of said carriage in response to a single command input from the user, namely, a first orientation wherein said carriage is aligned with said said first conveyor;

a working second orientation wherein said carriage is vertically between said first and second conveyors and angularly inclined about at least said major horizontal axis;

an third orientation wherein said carriage is aligned with said second conveyor; and wherein said user input and control means automatically controls transfer of a container between said carriage and one of said conveyors at each of said first and third orientations without user input beyond the single command, so that said angular adjustment means and said elevating mechanism are responsive to the single command for automatically cycling from said working second orientation to said third orientation for unloading of a container on said carriage to said second conveyor, thereafter to the first orientation for receiving a container on said carriage from the output end of said first conveyor, and thereafter to said working second orientation.

8. The transfer mechanism according to claim 7, further including said angular adjustment means being responsive to a second command for varying vertical height of the carriage selectively from the working second orientation.

9. The transfer mechanism according to claim 8, further including said elevating mechanism having means being responsive to a third command for selectively varying the angular inclination of said carriage about said major axis at the working second orientation.

10. The transfer mechanism according to claim 7, further including said elevating mechanism having means being responsive to a second command for selectively varying the angular inclination of said carriage about said major axis at the working second orientation.

11. The transfer mechanism according to claim 7, wherein said major axis and said minor axis are orthogonal to one another.

12. The transfer mechanism according to claim 7, wherein said carriage is rectangular with a length and a width, said major axis is parallel to the length of said carriage and said minor axis is parallel to the width of said carriage.

13. The transfer mechanism according to claim 7, wherein said elevating mechanism is a scissors type mechanism.

14. The transfer mechanism according to claim 7, wherein said carriage has a length and a width, and said carriage includes a plurality of freely rotatable rollers positioned across said width of said carriage.

15. The transfer mechanism according to claim 14, wherein said elevating mechanism is a scissors type mechanism.

16. The transfer mechanism according to claim 7, wherein said first and second angular adjustment means includes a piston cylinder arrangement.

17. The transfer mechanism according to claim 7, further including means for transporting the containers along said first and second gravity conveyors in a direction relative to the transfer mechanism.

18. A conveyor system for handling containers, including providing a user station for taking articles from a container or loading articles into a container, comprising:

an entrance conveyor for transporting the containers to an entrance station;

an exit conveyor for transporting the containers away from an exit station;

a container transfer mechanism, including a carriage for supporting at least one of the containers and being mounted for movement between an entrance position operatively adjacent with and aligned with the entrance station for receiving the one of the containers from the entrance conveyor, an exit position operatively adjacent and aligned with the exit conveyor at the exit station for discharging the one of the containers from the carriage to the exit conveyor, and a user position separate from each of the entrance and exit positions for conveniently holding the one of the containers at the user station for interfacing with a user in exchanging articles between the one of the containers held on the carriage and the user;

a user input device for inputting user commands;

a power mechanism for moving said carriage between the user position, the entrance position and the exit position sequentially, and automatically in response to a single unique next container command of the user commands from the user for automatically sequencing movement of said carriage, in order, for moving said carriage from the user position to the exit position, moving a container from said carriage onto said exit conveyor, moving said carriage from the exit position to the entrance position, moving a container from said entrance conveyor onto said carriage and moving said carriage from said entrance position to the user position; and wherein said power mechanism further includes, as a part of said automatically sequencing, means for tilting said carriage to bias a container on said carriage toward said exit conveyor prior to said moving a container from said carriage onto said exit conveyor, for tilting said carriage to bias a container by gravity away from said entrance conveyor prior to said moving a container from said entrance conveyor onto said carriage and for tilting said carriage about a horizontal axis orthogonally arranged with respect to an axis of tilting said carriage with respect to said entrance conveyor and said exit conveyor for providing a tilted container at the user station to facilitate user interface.

19. The conveyor system according to claim 18, further including power means for temporarily adjusting the height of said carriage at said user station without permanently changing the user position with respect to said automatically sequencing, in response to input of a user height adjust command.

20. The conveyor system according to claim 19, further including power means for temporarily adjusting the tilt of said carriage at said user station without permanently changing the user position with respect to said automatically sequencing, in response to input of a user tilt command.

21. The conveyor system according to claim 20, further including means responsive to input from the user for changing the user position of said automatically sequencing according to a current adjusted user position of said carriage.

22. A conveyor system for handling containers, including providing a user station for taking articles from a container or loading articles into a container, comprising:

an entrance conveyor for transporting the containers to an entrance station;

an exit conveyor for transporting the containers away from an exit station;

a container transfer mechanism, including a carriage for supporting at least one of the containers and being mounted for movement between an entrance position operatively adjacent with and aligned with the entrance station for receiving the one of the containers from the entrance conveyor, an exit position operatively adjacent and aligned with the exit conveyor at the exit station for discharging the one of the containers from the carriage to the exit conveyor, and a user position separate from each of the entrance and exit positions for conveniently holding the one of the containers at the user station for interfacing with a user in exchanging articles between the one of the containers held on the carriage and the user;

a user input device for inputting user commands;

a power mechanism for moving said carriage between the user position, the entrance position and the exit position sequentially, and automatically in response to a single unique next container command of the user commands from the user for automatically sequencing movement of said carriage, in order, for moving said carriage from the user position to the exit position, moving a container from said carriage onto said exit conveyor, moving said carriage from the exit position to the entrance position, moving a container from said entrance conveyor onto said carriage and moving said carriage from said entrance position to the user position;

power means for temporarily adjusting the height of said carriage at said user station without permanently changing the user position with respect to said automatically sequencing, in response to input of a user height adjust command; and further including power means for temporarily adjusting the tilt of said carriage at said user station without permanently changing the user position with respect to said automatically sequencing, in response to input of a user tilt command.

23. The conveyor system according to claim 22, further including means responsive to input from the user for changing the user position of said automatically sequencing according to a current adjusted user position of said carriage.

24. A conveyor system for handling containers, including providing a user station for taking articles from a container or loading articles into a container, comprising:

an entrance conveyor for transporting the containers to an entrance station;

an exit conveyor for transporting the containers away from an exit station;

a container transfer mechanism, including a carriage for supporting at least one of the containers and being mounted for movement between an entrance position operatively adjacent with and aligned with the entrance station for receiving the one of the containers from the entrance conveyor, an exit position operatively adjacent and aligned with the exit conveyor at the exit station for discharging the one of the containers from the carriage to the exit conveyor, and a user position separate from each of the entrance and exit positions for conveniently holding the one of the containers at the user station for interfacing with a user in exchanging articles between the one of the containers held on the carriage and the user;

a user input device for inputting user commands;

a power mechanism for moving said carriage between the user position, the entrance position and the exit position sequentially, and automatically in response to a single unique next container command of the user commands from the user for automatically sequencing movement of said carriage, in order, for moving said carriage from the user position to the exit position, moving a container from said carriage onto said exit conveyor, moving said carriage from the exit position to the entrance position, moving a container from said entrance conveyor onto said carriage and moving said carriage from said entrance position to the user position;

power means for temporarily adjusting the height of said carriage at said user station without permanently changing the user position with respect to said automatically sequencing, in response to input of a user height adjust command; and further including means responsive to input from the user for changing the user position of said automatically sequencing according to a current adjusted user position of said carriage.

25. A conveyor system for handling containers, including providing a user station for taking articles from a container or loading articles into a container, comprising:

an entrance conveyor for transporting the containers to an entrance station;

an exit conveyor for transporting the containers away from an exit station;

a container transfer mechanism, including a carriage for supporting at least one of the containers and being mounted for movement between an entrance position operatively adjacent with and aligned with the entrance station for receiving the one of the containers from the entrance conveyor, an exit position operatively adjacent and aligned with the exit conveyor at the exit station for discharging the one of the containers from the carriage to the exit conveyor, and a user position separate from each of the entrance and exit positions for conveniently holding the one of the containers at the user station for interfacing with a user in exchanging articles between the one of the containers held on the carriage and the user;

a user input device for inputting user commands;

a power mechanism for moving said carriage between the user position, the entrance position and the exit position sequentially, and automatically in response to a single unique next container command of the user commands from the user for automatically sequencing movement of said carriage, in order, for moving said carriage from the user position to the exit position, moving a container from said carriage onto said exit conveyor, moving said carriage from the exit position to the entrance position, moving a container from said entrance conveyor onto said carriage and moving said carriage from said entrance position to the user position; and further including power means for temporarily adjusting the tilt of said carriage at said user station without permanently changing the user position with respect to said automatically sequencing, in response to input of a user tilt command.

26. The conveyor system according to claim 25, further including means responsive to input from the user for changing the user position of said automatically sequencing according to a current adjusted user position of said carriage.

* * * * *